United States Patent [19]

Hayashi et al.

[11] Patent Number: 5,104,698
[45] Date of Patent: Apr. 14, 1992

[54] METHOD FOR IMPREGNATING A FIBROUS BASE MATERIAL WITH A SUBSTANTIALLY AIR-FREE VARNISH

[75] Inventors: Shigetoshi Hayashi; Takeyasu Mino; Yasuhiro Yagi; Mitsuaki Harada, all of Osaka, Japan

[73] Assignee: Takuma Co., Ltd., Osaka, Japan

[21] Appl. No.: 653,902

[22] Filed: Feb. 12, 1991

[30] Foreign Application Priority Data

Feb. 28, 1990 [JP] Japan .................. 2-49876

[51] Int. Cl.⁵ ............................ B05D 3/12
[52] U.S. Cl. ................... 427/365; 427/377; 427/434.2; 427/434.4; 427/434.6; 427/299
[58] Field of Search ......... 427/430.1, 296, 169, 427/359, 369, 377, 299, 365, 434.2, 434.4, 434.6

[56] References Cited

U.S. PATENT DOCUMENTS

| | | | |
|---|---|---|---|
| 1,595,474 | 8/1926 | Minton | 427/296 |
| 1,671,914 | 5/1928 | Westcott | 427/359 |
| 2,276,232 | 7/1939 | Gilbert | 427/369 |
| 4,690,836 | 9/1987 | Clarke et al. | 427/299 |
| 4,737,383 | 4/1988 | Matsumae et al. | 427/294 |

FOREIGN PATENT DOCUMENTS 60-40215 3/1985 Japan .................. 427/430.1

Primary Examiner—Michael Lusignan
Assistant Examiner—Diana L. Dudash
Attorney, Agent, or Firm—Griffin Branigan & Butler

[57] ABSTRACT

A method and apparatus for impregnating a fibrous base material with a varnish liquid, wherein the so-impregnated base material is substantially air free. A base material is passed under the surface of and through a supply of low-viscosity liquid such as to impregnate the base material with the low-viscosity liquid and displace air from the base material so as to provide a substantially air-free base material. The air-free base material is passed through an entrance for and into a syphon. An inert gas is supplied to the syphon so as to maintain an inert gas atmosphere therein sufficient to maintain the air-free condition of the base material. The air-free base material is then passed through an exit of the syphon and under the surface of and through a supply of varnish liquid sufficiently to displace the low-viscosity liquid from the air-free base material and impregnate the air-free base material with the varnish liquid.

6 Claims, 2 Drawing Sheets

METHOD FOR IMPREGNATING A FIBROUS BASE MATERIAL WITH A SUBSTANTIALLY AIR-FREE VARNISH

The present invention relates to a method and apparatus for impregnating a fibrous base material with a varnish liquid such that the impregnated base material, e.g. paper, cloth and woven or non-woven fabric, is air free and, therefore, most useful in fabricating a laminated board such as an electrical insulated board, a decorated board, or the like.

BACKGROUND OF THE INVENTION

For effectively impregnating a fibrous base material, especially a fibrous sheet-like base material, with varnish liquid, it is essential that the varnish liquid is internally absorbed into and uniformly distributed throughout the fibrous base material. Air bubbles trapped in the base material interfere with such impregnation and, therefore, must be eliminated to the extent possible.

In common varnish impregnating processes, a base material is preliminarily impregnated with an ordinary primer varnish to remove air bubbles and then fed via a timing roll into a varnish liquid for impregnation.

Those known varnish impregnating processes, however, have drawbacks, such that: (A) a uniform and sufficient impregnation of the base material with the varnish is not easy and the processes take long times; and (B) the air bubbles trapped in the base material are not sufficiently eliminated. Those drawbacks are more evident when a higher viscosity varnish is employed.

Another process has recently been introduced to the art, as shown in FIG. 3, in which a base material 11 is guided by guide rolls 17 to run through a preliminary impregnating tank 13' filled with a solvent or a varnish diluted with a solvent 13'a, referred to in the art as "preliminary impregnating liquid". When a diluted varnish is used, it contains a large amount of solvent, as opposed to an ordinary varnish liquid, which has been, in fact, used in the past for preliminary impregnation. A main varnish impregnating tank 13 is filled with an ordinary varnish liquid 13a.

In this process, air trapped in the base material 11 is displaced by the preliminary impregnating liquid 13'a and eliminated during the passing of the base material 11 through the preliminary impregnating liquid 13'a. Thus, by subsequently feeding the base material 11 into the ordinary varnish liquid 13a and, simultaneously, evaporating preliminary impregnating liquid 13'a absorbed in the base material 11, impregnation with the ordinary varnish 13a will be relatively efficient and air bubbles will be reasonably eliminated.

However, in the process shown in FIG. 3, the base material 11, during transition from the preliminary impregnating liquid 13'a to the ordinary varnish liquid 13a, is exposed to the air and, also, pressed by guide roll 17', arranged between the two tanks 13 and 13'. As a result, the removal of air from the base material 11 is obstructed and thus, the impregnation with ordinary varnish and providing an air-free base material is hindered.

More particularly, while the base material 11 runs on the guide roll 17', a contact pressure is exerted by the roll onto each fiber bundle of the base material 11. This pressure opens the fiber bundles and causes the preliminary impregnating liquid 13'a, retained in the fiber bundles and fiber strands by capillary action, to be displaced. When the opened fiber bundles are again formed into closed fiber bundles, as the fiber bundles are freed from the pressure exerted by the guide roll 17' (after passing that guide roll), both the displacement of the preliminary impregnating liquid and the restoration of the closed fiber bundles are executed in the air. This allows re-permeation of air through the base material to inevitably occur during the transition from the preliminary impregnating liquid 13'a to the ordinary varnish liquid 13a.

The present invention is directed, in view of the foregoing problems, to a varnish impregnating method and apparatus having substantial improvements both in the impregnation of the base material with ordinary varnish and in the air-free condition of the varnish impregnated base material.

BRIEF DESCRIPTION OF THE INVENTION

The above difficulties of the prior art are eliminated by the present varnish impregnation method and apparatus. In the present invention, the fibrous base material is first passed under the surface of an through a supply of low-viscosity liquid, such as a solvent or solvent-diluted varnish, and then through an inert gas-filled syphon. After passing through the syphon, the base material then passes under the surface of and through a supply of ordinary varnish liquid. The inert gas-filled syphon is arranged between and in communication with the low-viscosity liquid supply and the ordinary varnish liquid supply and, particularly, when the inert gas is soluble in the low-viscosity liquid, a substantially air-free varnish liquid impregnated base material results. Further, the invention seeks to prevent leakage, or substantially so, of the inert gas from the inert gas-filled syphon to the low-viscosity liquid and to the varnish liquid by pinching the base material, especially at an entrance and preferably at an exit of the inert gas-filled syphon. Further, the amount of the low-viscosity liquid contained in the base material is controlled by pinching the base material at a central region of the syphon.

Thus, very briefly stated, the present invention provides a method for impregnating a fibrous base material with a varnish liquid wherein the so-impregnated base material is substantially air free. The method comprises passing the base material under the surface of and through a supply of low-viscosity liquid contained in a reservoir therefor so as to impregnate the base material with the low-viscosity liquid and render the base material substantially air free. The air-free base material is then passed through an entrance into a syphon. The syphon is supplied with inert gas so as to maintain an inert gas atmosphere therein and to maintain the substantially air-free condition of the base material. Most preferably, the inert gas is soluble in the low-viscosity liquid, so that inert gas which may re-permeate the base material does not exist in the base material as a gas but only as a dissolved solute. Thereafter, the air-free base material passes through an exit of the syphon and under the surface of and through a supply of varnish liquid contained in a reservoir therefor sufficiently to displace the low-viscosity liquid from the air-free base material and uniformly impregnate the air-free base material with the varnish liquid.

An apparatus for carrying out the foregoing method is also provided. Thus, the apparatus is for impregnating a fibrous base material with a varnish liquid wherein the so-impregnated base material is substantially air free. The apparatus comprises a first reservoir for containing a supply of low-viscosity liquid. Transport means are provided for transporting the base material under the surface and through a supply of the low-viscosity liquid contained in the reservoir so as to impregnate the base material with the low-viscosity liquid and eliminate air therefrom so as to provide a substantially air-free base material. A syphon is at least partly disposed above the first reservoir and that syphon has an entry and exit therefor. Moving means are provided for moving the air-free base material through the entrance and through the syphon. An inert gas supply means supplies inert gas to the syphon so as to maintain an inert gas atmosphere in the syphon sufficient that air-free condition of the base material, disposed in the syphon, is maintained. A second reservoir is provided for containing a supply of the varnish liquid, and conveying means are provided for conveying the air-free base material through the exit of the syphon and under the surface of and through the supply of the varnish liquid contained in the second reservoir sufficiently to displace the low-viscosity liquid from the air-free base material and uniformly impregnate the air-free base material with the varnish liquid.

Thus, as a major feature of the invention, it will be seen that there is provided a method and apparatus for transporting the fibrous base material through a low-viscosity liquid and into an ordinary varnish liquid, in such a manner that air is both displaced from the fibrous material during that transportation and not allowed to re-permeate into the base material prior to entry into the ordinary varnish liquid. With this method and apparatus, the problems associated with the prior art, as discussed above, are obviated.

DETAILED DESCRIPTION OF THE INVENTION

Figure 1:
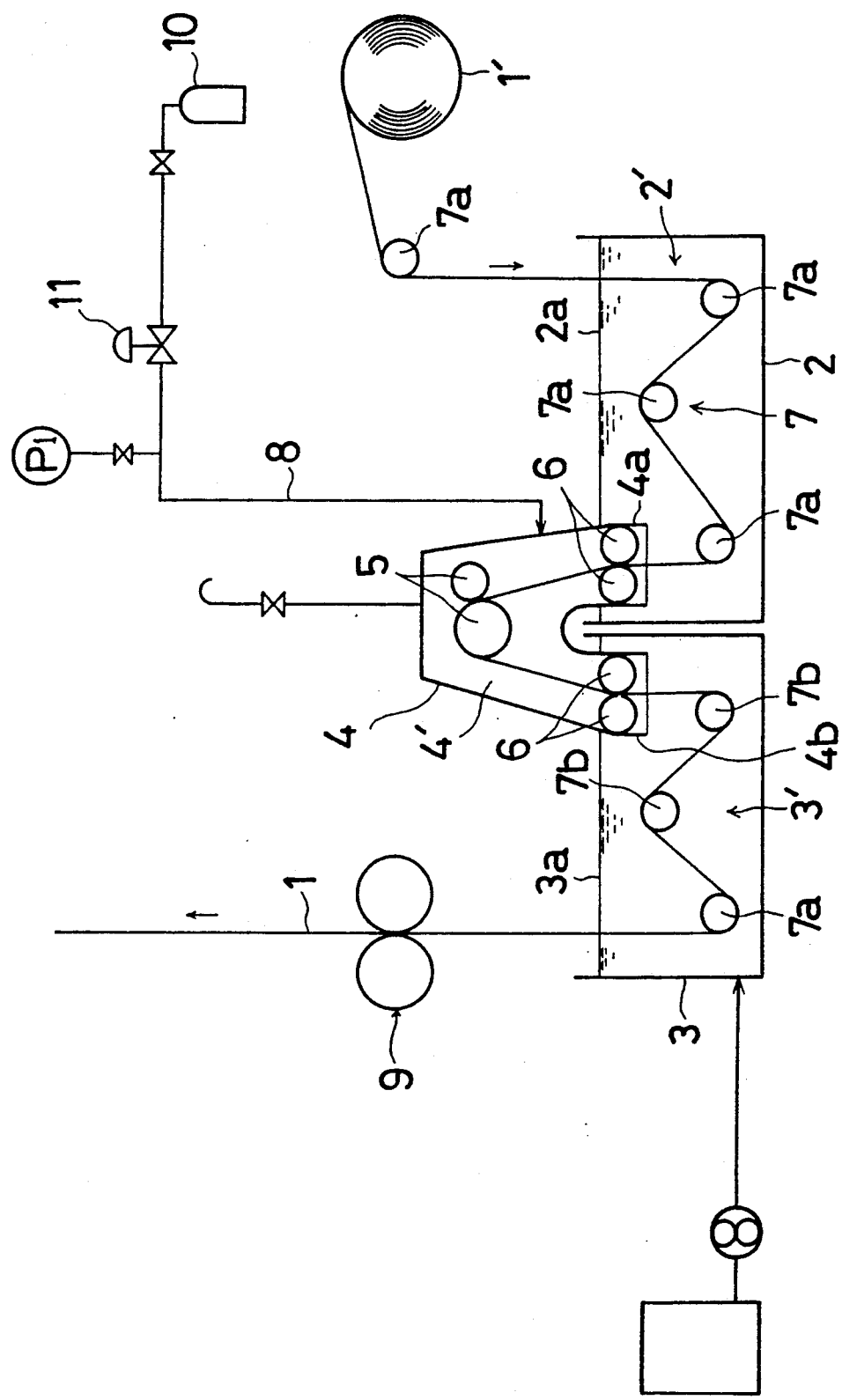
FIG. 1 is a schematic side view of the apparatus for carrying out the present invention.

As noted above, as the base material passes through the low-viscosity liquid, the air trapped in the base material will be displaced by the low-viscosity liquid and eliminated. The base material impregnated with the low-viscosity liquid in then transferred to the syphon filled with an inert gas. Preferably, the base material is pinched so that the amount of the low-viscosity liquid contained therein is reduced to that amount required only for solution of the inert gas disposed around and about fiber bundles of the base material, as explained in more detail below. Subsequently, the base material carrying that small amount of the low-viscosity liquid together with the inert gas which is dissolved in the low-viscosity liquid is conveyed to the ordinary varnish liquid. In other words, the base material, which contains a small amount of the low-viscosity liquid in which the inert gas is dissolved, is substantially free from air prior to being conveyed to the varnish liquid, and the syphon prevents air from entering the air-free base material during the transition from the low-viscosity liquid supply to the varnish liquid supply. Accordingly, the impregnated base material will be substantially air free.

As the base material is brought into the varnish liquid, the low-viscosity liquid, in which the inert gas is dissolved, is dissipated into the varnish liquid. Consequently, the low-viscosity liquid in the base material is replaced by the varnish liquid, and, thus, the base material will be uniformly impregnated with the varnish liquid.

The amount of the low-viscosity liquid dissipated into the varnish liquid is not great and, in any event, is less than that contained in the varnish liquid carried out of the supply of varnish liquid by the impregnated base material and, hence, causes no substantial dilution of the varnish liquid.

The base material is preferably pinched at both the entrance and the exit of the syphon by a pinching means which will largely contain the inert gas in the syphon such that the inert gas is largely prevented from flowing out of the syphon and, especially, into the low-viscosity liquid and also into the varnish liquid.

From the above, it will be appreciated that if the inert gas is allowed to substantially flow into the low-viscosity liquid, the low-viscosity liquid would become saturated with the inert gas. While in the syphon, the fiber bundles of the base material are subject to movement relative to each other. If air were in the syphon, that air would re-permeate the base material. However, since the syphon is filled with an inert gas, only inert gas can re-permeate the base material. When that inert gas is soluble in the low-viscosity liquid, such re-permeated inert gas will dissolve in the low-viscosity liquid and, hence, be removed as a gaseous material from the base material. In some cases of use of inert gas, the affinity of the inert gas for the fibers of the base material is substantially less than the affinity of air for the fibers of the base material. Hence, some inert gases will not substantially re-permeate the base material, even though the inert gas is not substantially soluble in the low-viscosity material, and the base material will remain substantially air free and void free (free of inert gas voids). However, it is far preferable that the inert gas is soluble in the low-viscosity liquid to ensure that any small amounts of the inert gas which has permeated and remains in the base material is dissolved in the low-viscosity liquid, associated with base material, and with such solution, the base material will not only be air free but also inert gas void free.

The particular inert gas can easily be chosen from standard references regarding gas solubilities in any chosen low-viscosity liquid, but with the usual low-viscosity liquids, i.e. varnish solvents, carbon dioxide is most suitable in view of its high solubility in such solvents and non-explosive nature. However, other such gases could be used, e.g. argon.

From the above, it can be appreciated that if the low-viscosity liquid supply were saturated with the inert gas flowing from the syphon, the low-viscosity liquid in and on the base material could not dissolve the inert gas re-permeated into the base material while in the syphon. As a result, the above-described functions would not take place.

Also, if the inert gas is allowed to substantially flow into the varnish liquid in the supply thereof, it would be dissolved in the low-viscosity liquid displaced in the varnish liquid from the base material. Since a varnish hardener or the like is normally dissolved in the low-viscosity liquid which will also be in the varnish liquid, any substantial further dissolving of the inert gas in the low-viscosity liquid will cause separation of the hardener to occur, due to supersaturation. This would cause a failure in the curing of the varnish liquid or a decrease in the bonding strength between the base material and the varnish liquid.

Thus, with the present impregnation method and apparatus, it is ensured that none of the foregoing difficulties occur, the impregnation with varnish liquid can be effectively carried out, the base material can be uniformly impregnated with the varnish liquid, and there are no substantial amounts of air or inert gas voids in the varnish impregnated base material, i.e. the base material is substantially void free.

With the above-discussed principles of the present invention in mind, the details of the invention are described below with reference to a preferred embodiment of the invention, as shown in FIG. 1.

FIG. 1 illustrates a varnish impregnation apparatus in which a fibrous base material in a sheet-like form 1, made of fibers, is fed by a guide mechanism 7 into a low-viscosity liquid storage tank 2, provided with an opened top and filled with a low-viscosity liquid 2a, such as a conventional varnish solvent. A varnish storage tank 3 is also provided with an opened top and filled with a conventional varnish liquid 3a. An inert gas-filled syphon chamber 4 is disposed above and between the two storage tanks 2 and 3, and pressure rolls 5, disposed within the syphon chamber 4, serve as a pinching mechanism. Pinching rolls 6 are disposed at both the entrance and the exit of the syphon chamber 4. Thus, a portion of the syphon 4 is disposed above the surface of the low-viscosity liquid, and a portion is disposed above the surface of the varnish liquid such that a portion of the displaced low-viscosity liquid returns to the supply thereof.

The guide mechanism 7 is provided for guiding the base material 1 along a given path in tank 2, and a similar mechanism is provided in tank 3. An inert gas supply conduit 8 is coupled to the syphon chamber 4, and an inert gas supply source 10 is provided for supplying an inert gas which is, most preferably, fully soluble in the low-viscosity liquid.

The base material 1 can be selected from any of the conventional varnish board base materials, such as woven or non-woven fabrics of synthetic or natural fibers (organic or inorganic fibers). Examples include papers, glass fibers woven fabrics and carbon fiber non-woven fabrics. Suitable synthetic fibers for use in such base materials include plastic fibers, e.g. aramid fibers, or any others of the conventional varnish board fibers. The particular fibers and the particular form of the base material is not critical, but a sheet-like form is preferred.

The low-viscosity liquid 2a should have adequate wettability for the base material 1 and is usually a conventional varnish solvent which has a viscosity of about or below 100 cP and, in any event, has a viscosity lower than that of the varnish 3a. Preferably, the low-viscosity liquid has properties similar to the properties of the solvent used in the varnish liquid so that it causes no difficulty when displaced within the varnish 3a, as noted above. Most conveniently, the low-viscosity liquid will be a conventional varnish solvent and at least one of the same solvents used in the varnish liquid. The low-viscosity liquid may contain varnish, usually the same varnish as used in the varnish liquid, so long as the viscosity, noted above, is observed. The low-viscosity liquid 2a may be maintained at a given temperature Ts by a thermal controller (not shown).

The varnish liquid 3a may be any of the conventional natural or synthetic varnishes and is not critical. Usually a common thermosetting resin varnish or a common thermoplastic resin varnish will be used. A natural resin varnish, or a no-solvent synthetic or natural resin varnish may be used. The varnish 3a may also be maintained at a given temperature Tw, which is lower than the temperature Ts of the low-viscosity liquid, by a thermal controller (not shown).

The syphon chamber 4 has a base material entrance section 4a and a base material exit section 4b, both usually being tubular and extending substantially perpendicularly from a bottom wall thereof disposed under the surfaces of the respective liquids, so as to form in an inverted U-shaped syphon. Both the base material entrance and exit, 4a and 4b, should open under, respectively, the surface of the low-viscosity liquid 2a and somewhere near the region 2' and under the surface of the varnish liquid 3a and somewhere near region 3', so as to define a syphon region 4' provided in the syphon chamber 4 which is, preferably, a sealed and gas-tight syphon by virtue of the liquid surfaces forming seals for the syphon. Each of the base material entrance and exit section 4a and 4b is provided with a pair of the pinch rolls 6 for substantially preventing the inert gas from flowing to the low-viscosity liquid 2a and the varnish liquid 3a, respectively.

The pinch rolls 5 and 6 are rotatable in response to the movement of the base material 1 thereabout or may be self-driven for rotation in the direction of the advancement of the base material 1. In the latter case, the circumferential speed of the rolls should correspond to the traveling speed of the base material 1.

The guide mechanism 7 comprises a plurality of guide rolls 7a and 7b, one of which rolls is disposed above the low-viscosity liquid storage tank 2 for feeding the base material 1 thereinto and the others of which are disposed in the two storage tanks 2 and 3 so that the base material 1 can start from a base material supply source 1' and pass through the low-viscosity liquid storage region 2' to the base material entrance section 4a, through the inert gas syphon region 4' (while being guided by the pinch rolls 6 and the pressing rolls 5), through the syphon exit section 4b, to the varnish storage tank 3, and finally through the varnish region 3'. In a preferred embodiment, at least one of guide rolls 7b, disposed in the varnish storage region 3', is of the expander type so that an expanding force can be applied in the widthwise direction of the sheet-like base material 1 to facilitate the varnish impregnation in the direction at a right angle to the direction of travel of the base material 1. Also, a varnish impregnating control mechanism 9 which comprises squeeze rolls or bars is provided above the varnish storage tank 3 for squeezing the base material 1 passing from the varnish storage tank 3, to control the impregnating amount of the varnish liquid.

In inert gas supply conduit 8 communicates with the inert gas supply source 10 which gas is, most preferably, soluble in the low-viscosity liquid 2a. The inert gas is fed via a pressure control valve 11 to the syphon region 4', where air has been discharged therefrom, and the pressure of the inert gas in the syphon is controlled thereby.

The impregnation method of the present invention will now be described in more detail referring to the aforementioned varnish impregnation apparatus.

The base material 1 is fed from the base material supply source 1' to the low-viscosity liquid storage tank 2 where it is immersed in the low-viscosity liquid 2a, and, thus, the air trapped in the base material 1 is displaced by the low-viscosity liquid 2a.

Figure 2:
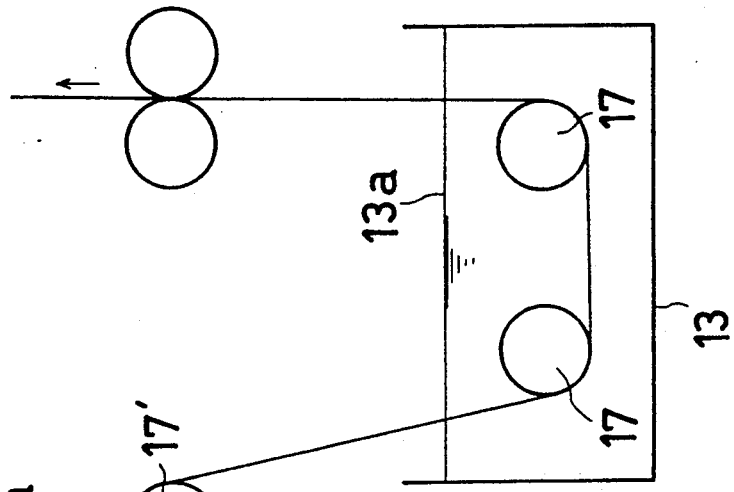
FIGS. 2A and 2B illustrate the phenomenon occurring when the fibrous material is impregnated with the liquid.
Figure 3:
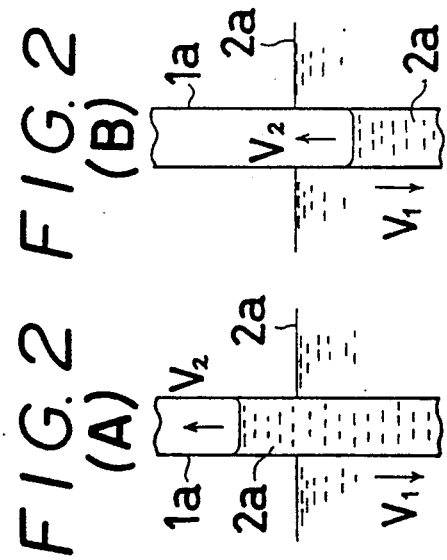
FIG. 3 is a schematic illustration of the prior art over which the present invention is an improvement.
Figure 3:
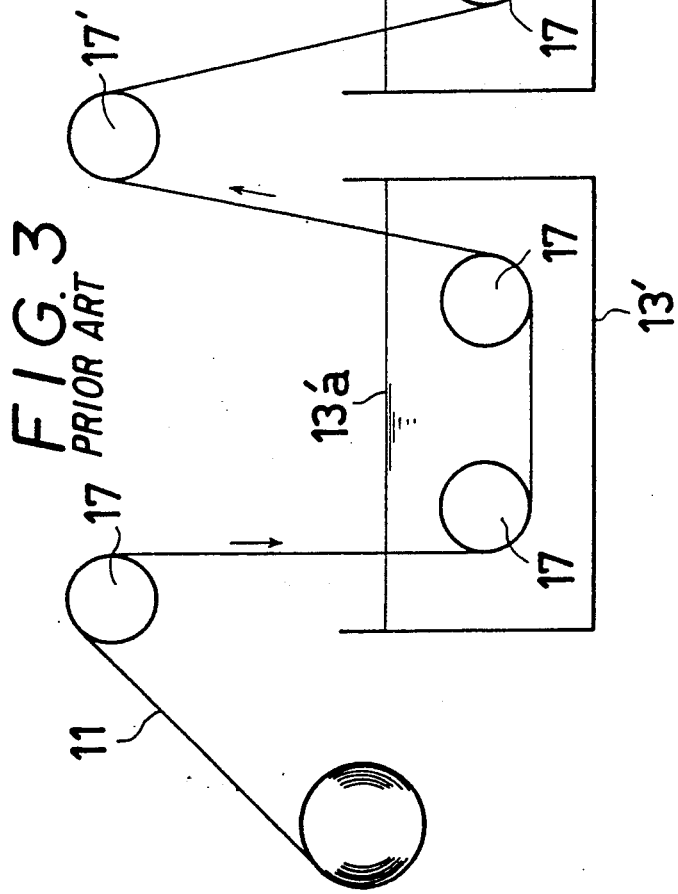

More particularly, as shown in FIGS. 2A and 2B, when the base material 1 reaches and moves under the surface of the low-viscosity liquid 2a, the low-viscosity liquid 2a penetrates into the fiber bundles 1a of the base material 1 by capillary action and, simultaneously, the air trapped in the bundles 1a is displaced by the force of the penetration. The penetrating action, upwardly into the downwardly moving fiber bundles, is, however, halted at some position by the resistance of the fiber bundles 1a to such penetration. The penetration is stopped in its upward movement and at a position above the liquid surface when the running speed of the base material i.e. the immersing speed V1 of the fiber bundles 1a, into the low-viscosity liquid 2a is smaller than a velocity V2 of the upward penetration of the low-viscosity liquid, as shown in FIG. 2A. Of course, that penetration position will be beneath the liquid surface 2a when V1 is greater than V2, as shown in FIG. 2B, and this should be avoided.

Accordingly, during the passing of the base material 1 through the low-viscosity liquid region 2', substantially all of the air trapped in the fiber bundles 1a is displaced by the low-viscosity liquid 2a and eliminated from the base material.

The base material 1, saturated with the low-viscosity liquid 2a, is moved through the entrance section 4a, which opens beneath the liquid level (surface) of the low-viscosity liquid in tank 2 so that the inert gas is sealed in syphon chamber 4. The pinching between the pressure rolls 5 should be sufficient that any surplus of the low-viscosity liquid 2a contained in the base material 1 is removed.

The inert gas-filled and sealed syphon chamber 4 is air free since any air therein has been removed by flushing the syphon chamber with inert gas. Thus, in that chamber there are only the inert gas and vapors of the low-viscosity liquid, and the chamber contains no air at all. Hence, the base material 1 can be transferred through the interior of the inert gas-filled and sealed syphon chamber 4 such that a small amount of the low-viscosity liquid, absorbed into the base material 1, dissolves the inert gas re-permeated into the base material 1 due to flexure thereof while passing through the syphon. The base material is then carried through the exit section 4b, opening under the surface of varnish liquid 3a and, thus, in the substantial absence of air or inert gas voids, into the varnish liquid storage tank 3 where the base material 1 is, thus, uniformly impregnated with the varnish liquid 3a.

The inert gas associated with base material 1 remains dissolved in the low-viscosity liquid carried in the base material and, thus, never lowers the quality of the varnish liquid 3a. The varnish liquid 3a is maintained at a temperature lower than that of the low-viscosity liquid 2a, thereby preventing the production of the inert gas bubbles resulting from vaporization (reboiling) of the inert gas in the varnish liquid 3a. The generation of voids filled with inert gas in the base material or the varnish liquid 3a is, thereby, prevented.

Also, the amount of the low-viscosity liquid brought into the varnish of varnish storage tank 3 during the above-noted operation is far less than the amount of low-viscosity liquid contained in the varnish liquid which is impregnated in the base material 1 and, thus, carried out of the process. Thus, the viscosity of the varnish liquid in tank 3 never drops.

The base material may be widthwisely expanded by the extension force of the expander guide roll 7b, when passing the same. After passing roll 7b, however, the extension force is released. Accordingly, the widthwise expansion of and the retraction of the fiber bundles occur in the varnish liquid 3a, and as a result, the widthwise impregnation of the base material is improved, and the fiber bundles will be sufficiently impregnated with the varnish liquid.

EXAMPLE

The above-described apparatus was operated in the above-described matter using the 7628 glass fiber cloth for producing electric base material. The varnish had the composition shown in the Table below. $CO_2$ was used as the inert gas. Methyl ethyl ketone, one of the solvents of the varnish 3a, was employed as the low-viscosity liquid 2a. The varnish temperature (Tw) was 15° C. and the low-viscosity liquid temperature (Ts) was 20° C. As a result, the low-viscosity liquid carried over into the liquid varnish in varnish storage tank 3 was only about 5 parts of the below-noted varnish composition. The base material was uniformly impregnated with the varnish liquid and without any adverse effects, such as a drop in the viscosity of the liquid varnish in the varnish storage tank 3. No voids were found in the varnish impregnated base material.

| | Composition of Varnish Liquid | |
|---|---|---|
| Varnish | epoxy resin | 100 parts |
| Solvent | methyl ethyl ketone | 25 |
| | methylcellosolve | 20 |
| | dimethylformamide | 15 |
| Hardening agent | dicyandiamide | 3.5 |
| Accelerator | imidazole | 0.1 |

As is apparent from the above, the present invention allows the base material to be uniformly impregnated with the varnish liquid, and within a short period of time and, particularly, with substantially no air bubbles or gas bubbles in the base material, i.e. the base material is essentially void free, e.g. air free and inert gas free (voids). This advantage is particularly noteworthy in connection with the impregnation using a relatively high viscosity varnish liquid. Thus, the present method and apparatus provides products which are ideally suited for electrical insulating boards or decoration boards and which will be much improved in quality. Also, with the present invention, no timing rolls are needed, and, thus, the apparatus is minimized in size and simplified in arrangement.

Further, since the syphon chamber, interposed between the low-viscosity liquid tank and the varnish liquid tank, is filled with an inert gas, any hostile incident, such as explosion of the solvent gas triggered by static electricity on the base material, is avoided.

The present invention provides such practical advantages as above described.

What is claimed is:

1. A method for impregnating a fibrous base material with a varnish liquid, wherein the so-impregnated base material is substantially air free, comprising:
   (a) passing the base material under the surface of and through a supply of low-viscosity liquid contained in a reservoir therefor such as to impregnate the base material with the low-viscosity liquid and displace air from the base material so as to provide a substantially air-free base material, said low viscosity liquid having a viscosity of about 100 cP or less;

(b) passing the air-free base material through an entrance for and into a syphon and pinching the base material at a first position near the syphon entrance but above the low-viscosity liquid surface, so as to remove from the base material a portion of the low-viscosity liquid therein and return the removed low-viscosity liquid portion to the supply thereof;

(c) supplying an inert gas which is soluble in the low-viscosity liquid into he syphon so as to maintain an inert gas atmosphere therein sufficient to maintain the air-free condition of the base material; and (d) passing the air-free base material through an exit of the syphon and under the surface of and through a supply of varnish liquid contained in a reservoir therefor sufficiently to displace the low-viscosity liquid from the air-free base material and impregnate the air-free base material with the varnish, and pinching the base material at a second position near the syphon exit but above the varnish liquid surface, so as to prevent inert gas in the syphon from flowing into the varnish liquid, and pinching the base material between said first and second positions.

2. The method of claim 1 wherein the entrance of the syphon is beneath the surface of the low-viscosity liquid and the exit of the syphon is beneath the surface of the varnish liquid so as to provide a substantially air-tight syphon.

3. The method of claim 2 wherein a portion of the syphon is disposed above the surface of the low-viscosity liquid and a portion of the syphon is disposed above the surface of the varnish liquid such that a portion of the displaced low-viscosity liquid returns to the supply thereof.

4. The method of claim 1 wherein the low-viscosity liquid is soluble in the varnish liquid.

5. The method of claim 4 wherein the varnish liquid contains at least one varnish solvent and the low-viscosity liquid is the same as at least one of the varnish solvents.

6. The method of claim 1 wherein the temperature of the supply of low-viscosity liquid is greater than the temperature of the varnish liquid, so that inert gas dissolved in the low-viscosity liquid remaining in the base material entering the varnish liquid will not reboil.

* * * * *